July 20, 1937.  F. C. G. SCHELBECK  2,087,630
CENTRIFUGAL SEPARATOR FOR SEPARATING LIQUIDS, EMULSIONS, AND DISPERSIONS
Filed Feb. 20, 1935
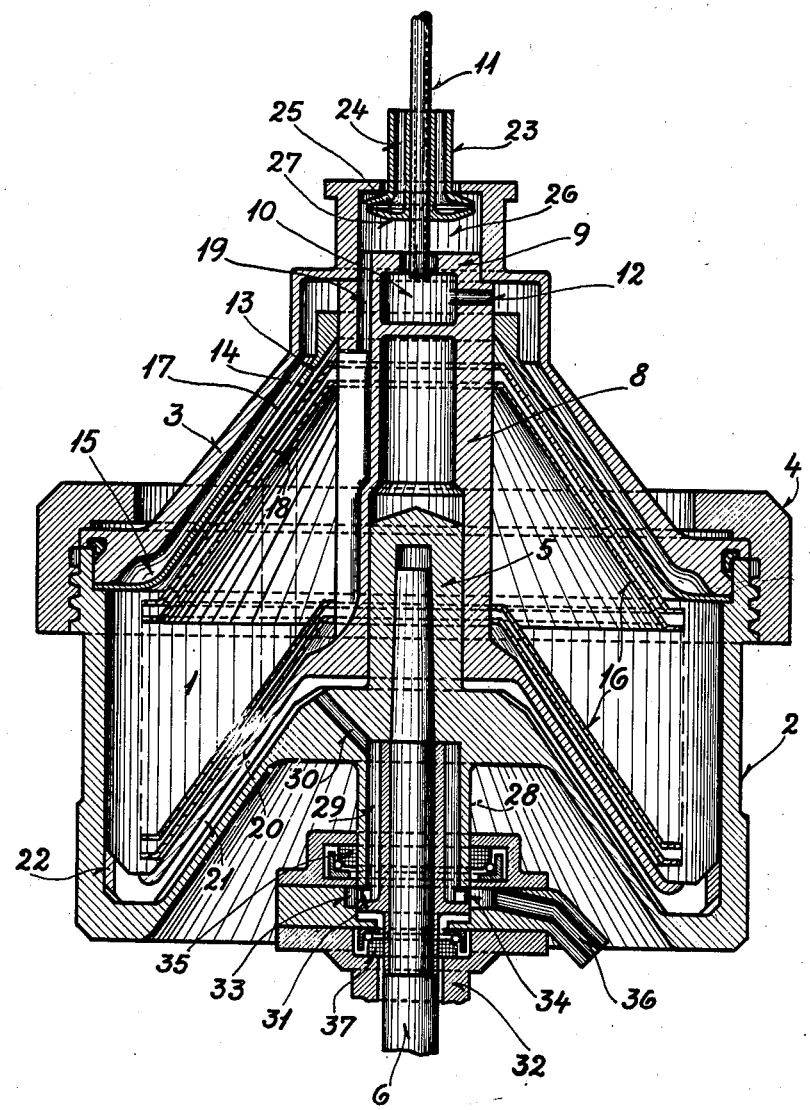
INVENTOR
FREDERIK C. G. SCHELBECK
BY *H. B. Wilson & Co.*
ATTORNEYS Patented July 20, 1937

2,087,630

UNITED STATES PATENT OFFICE 2,087,630

CENTRIFUGAL SEPARATOR FOR SEPARATING LIQUIDS, EMULSIONS, AND DISPERSIONS

Frederik Casper Günther Schelbeck, Copenhagen, Denmark

Application February 20, 1935, Serial No. 7,452
In Denmark February 26, 1934

2 Claims. (Cl. 233—28)

The invention relates to a centrifugal separator for separating liquids emulsions and dispersions into two or more components and of the type comprising a rotary drum or bowl containing an inset of spaced distributing plates.

It has been proposed to provide a separator of this type with a central device having a central chamber at its upper end to receive the liquid to be treated, the chamber having substantially radial openings and pipes therefrom for the delivery of the liquid to the usual holes in the distributing plates, said central device also having axial outlet passages for the lighter component, the heavier component or skim escaping from the circumferential part of the drum through an outlet passage at the upper part of the drum.

In a centrifugal separator according to the invention, the inflow channel for the liquid to be treated and the outflow channel for the lighter component are situated at one end of the drum, while the outflow channel for the other component or components of the liquid is situated at the opposite end of the drum, and the separator has a central device which has at its upper part a chamber centrally placed for the inlet and distribution of the liquid, this chamber having substantially radial and tangential distributing channels for the distribution of the liquid over an upper distributing plate in the separation chamber and axial outlet channels for the lighter component of the liquid, the lower part of the device being in the form of an inverted bowl-shaped plate which extends into the vicinity of the circumference of the separation chamber and together with the bottom of the drum forms the outlet channel for the heavier component of the liquid. The upper distributing plate is spaced from the upper part of the drum and adapted to form herewith a preliminary sludge chamber. The outlet channels are provided with foam-preventing outlet devices.

This enables the separator to be easily dismounted for cleaning purposes, and ensures the necessary tightness between the parts of the drum or the channels for the separated components so as to avoid leakage of the liquid and its components one to the other.

One form of separator according to the invention is shown in sectional elevation in the accompanying drawing.

The separation chamber 1 is situated in a drum-shaped body, the so-called separator drum, which consists of two parts 2 and 3 kept together by a nut 4. The part 2 of the drum has a central neck 5 by means of which the separator drum is mounted on the spindle 6 of the separator.

The separator has a centrally placed part 8, which at its lower part fits the neck 5 and at its upper part has a spigot 9 which is fitted in a boring in the part 3 of the drum. The part 8 has at its upper part a central chamber 10 to receive and to distribute the liquid which is led to it through a tube 11. The chamber 10 has substantially radial and tangential distributing channels 12, having their outlets above an upper distributing plate 13 placed in the separation chamber 1 for the distribution of the liquid. The distributing plate 13 is spaced from the part 3 of the drum so as to form therewith a chamber 14 separated from the separation chamber. The distributing plate 13 and the drum part 3 are shaped in such a way that at its outer circle the chamber 14 has an extension 15 serving as a receptacle for sludge and any solid particles which may be in the liquid and which are separated from the liquid immediately upon its entrance into the chamber 14. This, to a great extent, avoids sludge being deposited on the walls of the separation chamber or on the distributing plates 16. The circumferential edge of the distributing plate 13 is fitted between the two parts 2 and 3 of the separator drum with or without intermediate packing, whereby a complete and reliable tightening between the separation chamber 1 and the sludge chamber 15 is obtained.

The upper distributing plate 13 is provided with holes 17 through which the liquid is led to the separation chamber 1 and distributed between the distribution plates 16 for which purpose they are furnished with holes 18, which will co-operate with the holes 17 of the upper distribution plate.

Further the holes 17 of the distributing plate 13 are placed in the vicinity of the top of the separation chamber and in the vicinity of the upper end of the part 8 which in addition to the chamber 10 and the distributing channels 12 contain axial outlet channels 19. In this way it is obtained that the passage of the lighter component from the distributing channels 12 to the outlet channels 19 is made short which has the advantage that the greater and consequently easily and quickly separated particles of the lighter liquid component do not interfere with the free passage of the smaller and more difficultly gradually separated liquid particles. By making the passage of the lighter component short, there is further less danger of a liquid being made homogeneous so that it cannot be separated by centrifuging which for instance as far as milk is concerned may take place when the milk has a long passage and consequently is exposed to treatment for a long time. By the construction above described a more reliable and more perfect separation of the liquid in its several components is obtained than by the hitherto used centrifugal separators.

The part 8 is at the bottom extended to an inverted bowl-shaped division plate 20, which extends into the vicinity of the circumference of the separation chamber and together with the part 2 of the drum forms an outlet channel 21 for the heavier component of the liquid. By thus constructing the part 8 and the division plate 20 in one piece there is no possibility of a passage or leakage of the lighter component of the liquid from the separation chamber 1 to the outlet channel 21 or to the distributing channels 12.

The division plate 20 is at its outer edge furnished with a scraping edge 22 which, when the separator drum is dismounted for cleaning, will scrape off any sludge and solid parts which during the centrifuging may have settled on the drum wall.

To prevent the liquid components at their outlets from the separator drum being mixed with air and thereby forming foam, the outlet channels may have so far well-known foamless outlet devices. As shown in the drawing, the foamless delivery device for the lighter component comprises a disc 27 which is split or narrowly slotted at its circumference and has passages 25 leading into the outlet passages 24 in a stem 23, the disc 27 being so arranged that it is constantly submerged in the liquid in the chamber 26, which liquid, on account of the rotation of the separator, is under pressure, whereby the mixing with the air is prevented.

Instead of such a device submerged in the liquid, a centrifugal pump rotating with the separator drum may be provided, for example, a pump such as shown in the drawing at the outlet channel for the heavier component. A centrifugal pump of this type may consist of a device 28 having through passage channels 29 co-operating with the channels 30 coming from the outlet channel 21. Further, the said device has a slot 31 which leads into a chamber 33 arranged in the separator holder 32, and is provided with radial or curved vanes 34 which may set up a pressure on the liquid component so as to prevent it mixing with air. The tightening between the separator holder 32 and the device 28 is effected by means of packings 37 and 35. The chamber 33 discharges through a tube 36, and this as well as the device 23 may be connected by means of pipes to other apparatus for the further treatment of the liquid components.

The pressure produced by these outlet devices may thus be utilized to convey the liquid to the other apparatus, so that additional means for these purposes may be dispensed with.

Having now particularly described and ascertained the nature of my said invention and in what manner the same is to be performed, I declare that what I claim is:

1. In a separator, a drum composed of upper and lower sections detachably connected with each other, said upper section being provided with an inlet for unseparated liquid and with an outlet for the lighter separated component of the liquid, said lower section being provided with outlet means for the heavier separated component; a removable one-piece distributor plate carrier within said drum, said carrier having a dome-like separating plate extending to the side wall of said drum and directed in the direction of flow, and a central stub integral with and projecting upwardly from said separating plate; the upper end of said central stub being apertured for conducting the unseparated liquid from said unseparated liquid inlet into said upper section of said drum, and being apertured also for conducting the lighter component to said lighter component outlet; said dome-like separating plate being cooperable with the bottom of said drum in forming conducting means leading from the interior of the drum to said heavier component outlet means; and an upper separating plate closely surrounding the aforesaid stub between the point at which the unseparated liquid leaves said stub in entering the drum and the point at which the lighter component enters said stub in leaving said drum, the peripheral edge of said upper separating plate being tightly held between said upper and lower drum sections and being spaced from said upper section to provide a chamber to receive sludge and solids preliminarily separated from the incoming liquid, said upper separating plate being provided with passages spaced inwardly from its outer edge for conducting the sludge-and-solid-free liquid into the subjacent separating chamber, said lower separating plate being provided with a scraping edge in contact with the side wall of said drum to scrape any sludge deposits from said side wall as said carrier is upwardly withdrawn from said lower drum section.

2. A separator drum containing a central one-piece upwardly removable body in the upper portion of which are provided inlet channels for the liquid to be separated and outlet channels for the separated lighter component, the lower portion of said one-piece body being shaped to provide a cup-shaped bottom in the direction of flow of the liquid, said bottom coacting with the bottom of the separator drum in forming outlet channels for the separated heavier component, said central body being provided with a liquid distributing plate of cup-shaped form and pointing in the direction of flow of the liquid, said liquid distributing plate being peripherally connected with the side wall of the drum and cooperating with the top of said drum in forming a sludge space, said liquid distributing plate having an opening spaced inwardly and upwardly from the drum side wall for conducting the incoming liquid into the subjacent portion of the drum without allowing such liquid to affect the aforesaid sludge space, whereby the incoming liquid will not disturb the accumulated sludge in said sludge space.

FREDERIK CASPER
GÜNTHER SCHELBECK.